(12) United States Patent
Miyazaki

(10) Patent No.: US 7,926,723 B2
(45) Date of Patent: Apr. 19, 2011

(54) CARD CASE

(75) Inventor: Atsushi Miyazaki, Nagano-ken (JP)

(73) Assignee: Seiko Epson Corporation (JP)

( * ) Notice: Subject to any disclaimer, the term of this patent is extended or adjusted under 35 U.S.C. 154(b) by 689 days.

(21) Appl. No.: 11/235,325

(22) Filed: Sep. 27, 2005

(65) Prior Publication Data

US 2006/0102728 A1    May 18, 2006

(30) Foreign Application Priority Data

Nov. 17, 2004   (JP) ................................ 2004-332896

(51) Int. Cl.
 *B65D 85/00*  (2006.01)
 *A45C 11/18*  (2006.01)
 *G06K 7/00*  (2006.01)

(52) U.S. Cl. .................. 235/486; 150/147; 206/307

(58) Field of Classification Search ................. 235/486; 150/147; 206/307
See application file for complete search history.

(56) References Cited

U.S. PATENT DOCUMENTS

| | | | | |
|---|---|---|---|---|
| 5,898,159 | A | * | 4/1999 | Huang .......................... 235/441 |
| 7,044,368 | B1 | * | 5/2006 | Barron .......................... 235/380 |
| 7,337,979 | B2 | * | 3/2008 | Takao ............................ 235/492 |
| 2003/0107877 | A1 | * | 6/2003 | Mennecart et al. ........... 361/752 |
| 2006/0144953 | A1 | * | 7/2006 | Takao ............................ 235/492 |

FOREIGN PATENT DOCUMENTS

JP    5-130912    5/1993

* cited by examiner

*Primary Examiner* — Jamara A Franklin
(74) *Attorney, Agent, or Firm* — Harness, Dickey & Pierce, P.L.C.

(57) ABSTRACT

A card case comprises a storage section storing an IC card, which is provided with a finger print sensor and an input unit. The storage section includes a suppressing part suppressing the input unit through insertion of the IC card in the storage section.

5 Claims, 3 Drawing Sheets

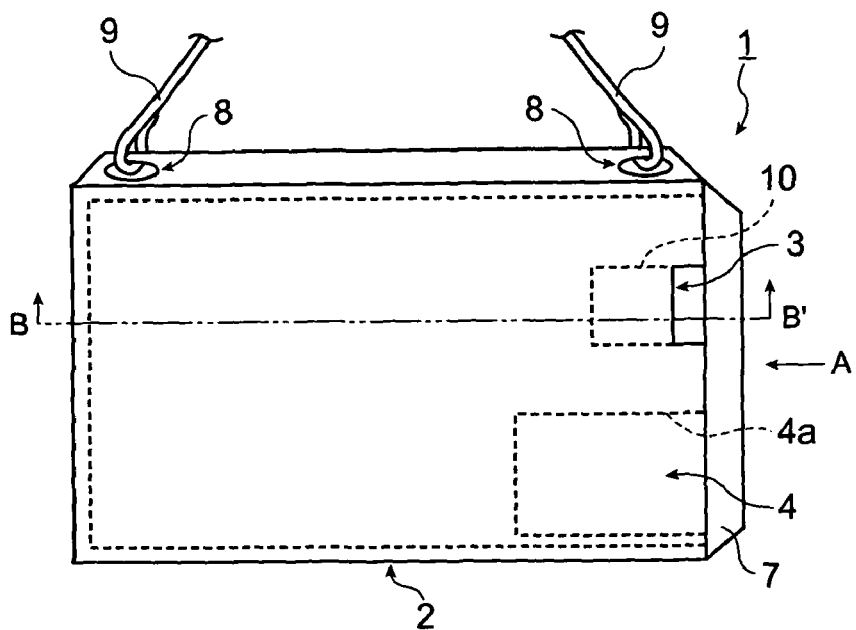
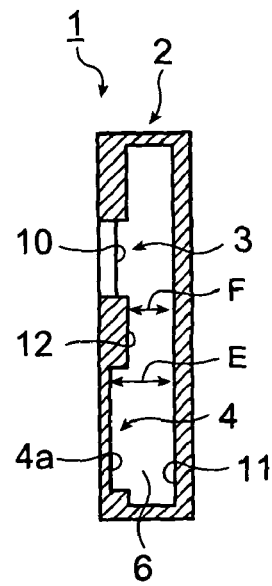
FIG. 1A  FIG. 1B
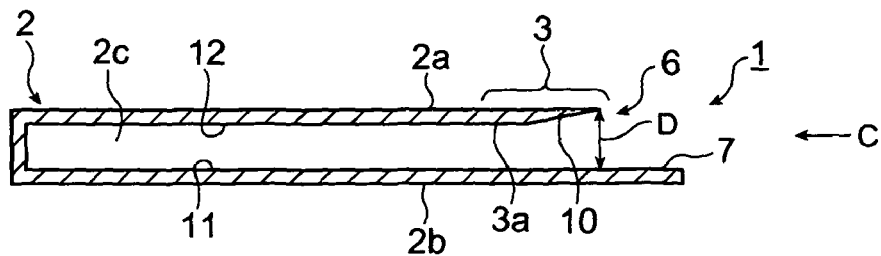
FIG. 1C
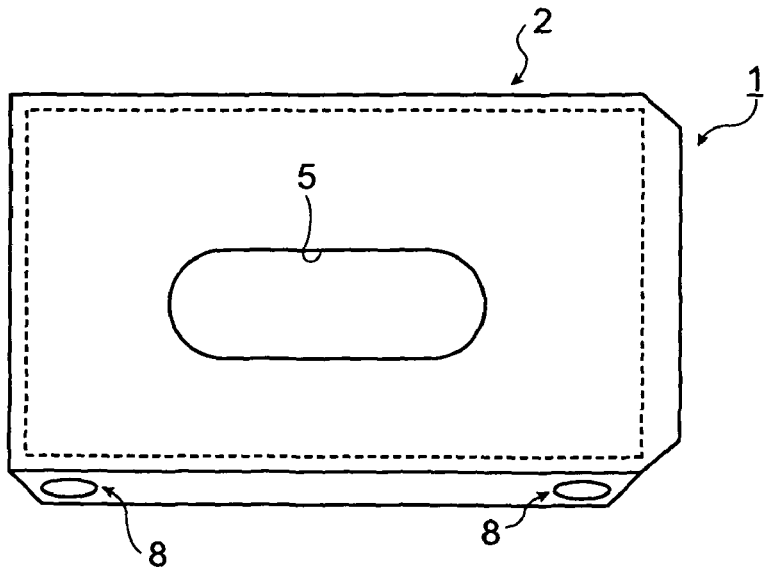
FIG. 1D

CARD CASE

RELATED APPLICATION INFORMATION

This application claims priority to Japanese Application No. 2004-332896, filed Nov. 17, 2004, whose contents are expressly incorporated herein by reference.

BACKGROUND OF THE INVENTION

1. Technical Field

The present invention relates to a card case storing an IC card.

2. Related Art

A storage element storing a thin card such as a magnetic bar or a chip has been currently known in a card case. The Japanese Unexamined Patent Publication No. 5-130912 is an example of related art.

Such storage element prevents damage when inserting a card into a storage chamber, or prevents information contained in a magnetic bar from being partially damaged.

On the other hand, an IC card (smart card) mounted with an IC (integrated circuit) chip has recently been proposed. Such an IC card, by comparison to a magnetic stripe card, realizes higher capacity of information, improved capacity for security (preventing counterfeit, alteration, and illicit use), capability to cope with a plurality of applications, reduction of a host load (capable of off-line processing), and the like.

Further, an IC card equipped with a switch which permits a user to input specific information or select various applications or with a finger print sensor for personal verification has been proposed.

When storing an IC card equipped with a switch or a finger print sensor in a card case (storage element) described in the above-referenced patent document, there is a problem of pressing the switch through inadvertent or some unexpected contact to cause wrong operation. Further, there is another problem with the finger print sensor on whose surface is formed a thin passivation film which may be damaged by a scratch.

SUMMARY

An advantage of the invention is to propose a card case, which can suppress wrong inputting of the IC card switch or damaging the finger print sensor.

According to a first aspect of the invention based on the above as conceived by the inventor, a card case of the invention is a card case storing an IC card equipped with a finger print sensor and an input unit in its storage section, the storage section having an suppressing part which suppresses the input unit as the IC card is inserted into the storage section.

It is preferable in the invention that the IC card is put into a halt status as the input unit is suppressed by the suppressing part, while the input unit, when not suppressed, is in an initiating status.

Further, the IC card is designed such that it is provided with the finger print sensor and that its internal arithmetic unit carries out user's personal verification automatically by comparing user's finger print information to input information inputted from the finger print sensor.

In such setup, upon insertion of an IC card into the storage section the suppressing part suppresses the input unit, hence, the IC card may be placed in the halt status. On the other hand, upon taking the IC card out of the storage section, the input unit cannot be suppressed, so that the initiating status can be introduced. Consequently, since the halt status can be maintained when the card is stored, even if another input is made into the IC card, wrong initiation or wrong operation does not occur. Therefore, it is possible to control the on/off of the IC card operation with certainty.

Further, in the card case of the invention, the suppressing part has a sloped portion, which suppresses the input unit in a perpendicular direction to a direction of inserting the IC card as the IC card is inserted into the storage section.

At this point, when the IC card is inserted into the storage section, the sloped portion and an upper part of the input unit come into contact. As the IC card is inserted deeper into the storage section, the sloped portion, its surface sliding on the upper part of the input unit, suppresses the input unit in the perpendicular direction to the inserting direction. In this manner, by using sliding motion between the sloped portion and the input unit, it is possible to suppress the input unit in the perpendicular direction, which is different from the inserting direction.

Further, in the card case of the invention, the suppressing part is formed on a first window part capable of opening and closing on the storage section, so that by opening the first window part while the IC card is in a condition of being stored in the storage section, the input unit protrudes in a reverse direction to the direction in which the suppressing part suppresses.

At this point, when the IC card is stored in the storage section with the first window part closed, the suppressing part suppresses the input unit, thereby maintaining the IC card in the halt status. Further, when the first window part is open, the upper part of the input unit protrudes while sliding on the surface of the sloped portion of the suppressing part. Consequently, by opening and closing the first window part, it is possible to control with certainty the on/off of the IC card operation with the IC card being stored in the storage section.

Further, in the card case of the invention, the storage section has a step part, which forms a space between the storage section and the finger print sensor at a position corresponding to the finger print sensor of the IC card to be inserted into the storage section.

By having the step part in this manner, in cases such as inserting the IC card into the storage section or when the IC card is being stored in the storage section, a space is formed between the finger print sensor and the storage section to enable the finger print sensor and the storage section to be held in a non-contact state, thus preventing scratches from being formed due to the contact and sliding of the storage section and the finger print sensor.

Further, in the card case of the invention, the step part is formed on a second window part capable of opening and closing. By opening the second window part while the IC card is in a condition of being stored in the storage section, the finger print sensor exposes itself outside the storage section.

At this point, when the IC card is stored in the storage section while the second window part is in the closed state, the step part forms a space between the storage section and the finger print sensor and protects the finger print sensor. Further, when the second window part is in the open state, the finger print sensor exposes itself outside the storage section.

As a result, by opening and closing the second window part, it is possible to protect the finger print sensor or expose the finger print sensor while the IC card is in the condition of being stored in the storage section. Consequently, it is possible to carry out personal verification of the user by using the finger print sensor with the IC card in the condition of being stored.

Further, in the card case of the invention, the storage section includes an opening part exposing partially a main surface of the IC card, which is inserted in the storage section.

In this way, it is possible for the user to touch the IC card by a finger through the opening part. As the finger that touched the IC card provides shifting power in the reverse direction to the inserting direction of the IC card, the IC card can be easily taken out of the storage section.

Further, in the card case of the invention, the storage section includes an inserting mouth for the IC card to be inserted into, and the inserting mouth has a guide part that guides the IC card.

In this way, when the user stores the IC card in the storage section, part of the IC card is permitted to contact the guide part, and by letting part of the IC card to be inserted into the inserting mouth, the IC card can easily be stored in the storage section.

On the other hand, if there is no guide part, the user must insert the IC card directly into the inserting mouth, so that it is not easy to insert the IC card into the storage section. Consequently, by having the guide part, the IC card can be easily stored in the card case.

Further, in the card case of the invention, the storage section includes a fall-off preventing part, which prevents the IC card stored in the storage section from falling off.

Through this arrangement, even if the inserting mouth is turned to face a fall-off direction with the IC card which is stored in the storage section, the IC card will not drop, and it is possible to control the IC card from dropping or falling off. Consequently, by including the fall-off preventing part, it is possible to maintain with certainty a condition in which the IC card is stored in the storage section.

Further, in the card case of the invention, the storage section is formed of a transparent material. Through this arrangement, it is possible to ascertain whether the storage section has the IC card or not.

Further, in the card case of the invention, the storage section is formed of a flexible material. Through this arrangement, it is possible to realize a card case having flexibility. Further, it is possible to attach a card case to a flexible member and use it. For example, a card case may be attached to clothes and the like.

Further, in the card case of the invention, the storage section has a linking part, which can be linked up with a holding member holding the storage section. This setup enables it to be linked easily with the holding member through the linking part.

BRIEF DESCRIPTION OF THE DRAWINGS

The invention will be described with reference to the accompanying drawings, wherein like numbers refer to like elements, and wherein:

FIG. 1A is a plan view seen from a front side of the card case;

FIG. 1B is a side view seen from the direction of arrow A of FIG. 1A;

FIG. 1C is a sectional view of a section along B-B' of FIG. 1A;

FIG. 1D is a plan view seen from a reverse side (surface opposite to the surface shown in FIG. 1A) of the card case;

DESCRIPTION OF THE EMBODIMENTS

Figure 2A:
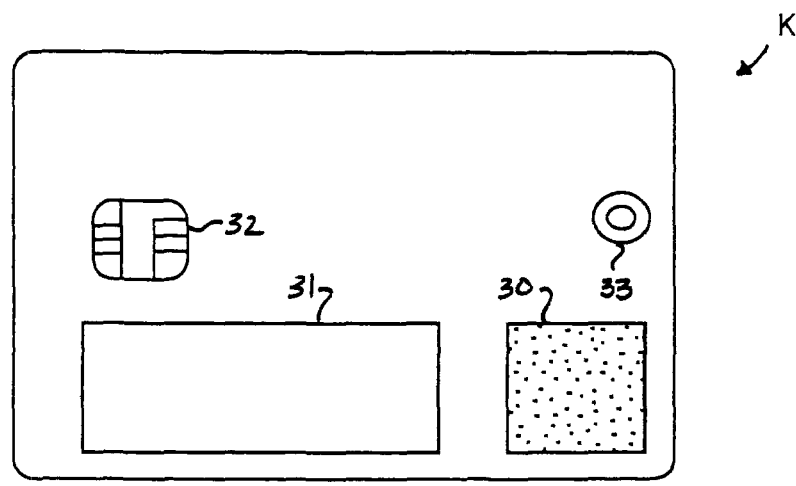
FIG. 2A is a plan view of an IC card.

Embodiments according to a card case of the invention will now be described.

While the embodiments show one form of the invention, it by no means limits the invention, and modifications and variations are possible within the technical concepts of the invention. Furthermore, in each diagram shown below, since each layer and each member are in sizes large enough to be recognized on the drawings, a different reduced scale is used for each member.

First Embodiment of a Card Case

A first embodiment of a card case of the invention will be described with reference to the drawings.

FIGS. 1A to 1C are exterior views of a card case according to the embodiment. FIG. 1A is a plan view seen from a front side of the card case, FIG. 1B is a side view seen from an arrow A of FIG. 1A, FIG. 1C is a sectional view of a section along B-B' of FIG. 1A, and FIG. 1D is a plan view seen from a reverse side (surface opposite to the surface shown in FIG. 1A) of the card case.

As shown in FIGS. 1A to 1C, the card case 1 has an outer form of approximately rectangular shape to fit a shape of an IC card to be explained later. Further, the card case 1 comprises a case body (storage section) 2, a suppressing part 3, a step part 4, an opening part 5, an inserting mouth 6, a guide part 7, a holding slot (linking part) 8, and a belt (holding member) 9.

The case body 2 is a box-shaped member composed of an upper member 2a and a lower member 2b, having a storage space (storage section) 2c inside the case body 2 in which to store the IC card. And each dimension of length, width, and height of the storage space 2c is set such that it is a slightly larger value than each dimension of length, width, and height of the card case 1.

This makes it possible for the IC card to be stored inside the storage space 2c of the case body 2 and to be taken out easily when the user uses the IC card.

Further, the case body 2 is formed of a resin material having flexibility and transparency. As such resin materials, there are employed plastic materials excelling in dimensional stability, for example, acryl, polyimide, polyethylene terephthalate (PET), polyethylene naphthalate (PEN) and the like.

Further, the suppressing part 3 is formed corresponding to a planar position of an input switch (input unit) provided at the IC card. The suppressing part 3 has a planar portion 3a and a sloped portion 10. The planar portion 3a herein is a surface parallel to an inner bottom surface 11 of the case body 2, such as to hold the input switch of the IC card in an suppressing state as explained later.

Further, the sloped portion 10 is a surface sloped with respect to an inserting direction C of inserting the IC card into the case body 2, such that a gap D between the sloped portion 10 with respect to the perpendicular direction of the inner bottom surface 11 and the inner bottom surface 11 is made gradually smaller according to a direction pointed by the inserting direction C.

Further, the step part 4 is formed corresponding to a planar position of the finger print sensor provided at the IC card. A distance E is from the upper surface 4a to the inner bottom surface 11, where the step part 4 is formed, and a distance F is from the inner upper surface 12 and the inner bottom surface 11 of the case body 2, where the step part 4 is not formed. The relationship between them is that the distance E is larger than the distance F. This means that the step part 4 has a space of a height dimension obtained by subtracting the distance E from the distance F.

Further, the opening part 5 is a long slot formed only on the reverse side of the case body 2. The long slot extends towards the inserting direction C. By this means, it is designed such that when taking out the IC card stored in the case body 2, the IC card may be easily taken out as the user holds the reverse side (main surface) of the IC card by putting a finger into the opening part 5 and slides the IC card towards the inserting mouth 6.

Further, the inserting mouth 6 is an entrance through which the IC card is inserted into the case body 2. Still further, when taking the IC card out, too, it is possible to do so through the inserting mouth 6. Furthermore, the guide part 7 is formed at the inserting mouth 6.

The guide part 7 is a part where there is no overlapping of the upper member 2a and the lower member 2b in the vicinity of the inserting mouth 6, thus making the guide part 7 in an exposed state in a plan view shown in FIG. 1A.

The holding slot 8 is a long slot linking a belt 9, which the user hangs around a neck, to the case body 2. In the embodiment, the holding slots 8 are respectively formed on the upper right part and the upper left part, so that, by letting the belt 9 pass through the both holding slots 8, the card case 1 may be stably positioned at the breast of the user.

It should be noted that the holding slot 8 may be formed at the upper middle part instead of forming the holding slots 8 on the upper right part and the upper left part, whereby a clip (holding member) may be linked to tack it to a breast pocket and the like.

IC Card

Next, an IC card to be stored in the card case 1 will be described.

Figure 2B:
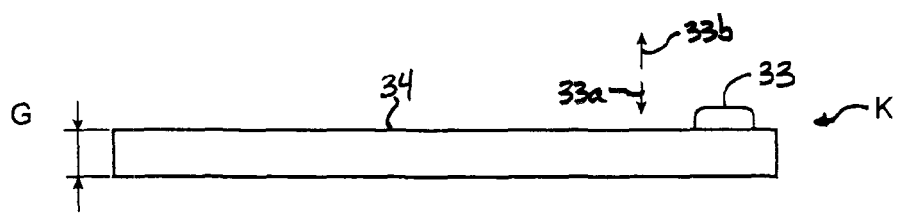
FIG. 2B is a side view of the IC card.

FIGS. 2A and 2B are exterior views showing the IC card. FIG. 2A is a plan view of the IC card and FIG. 2B is a side view of the IC card.

As shown in FIG. 2A, an IC card K includes a finger print sensor 30, an electrophoretic display (hereinafter referred to as EPD) 31, a connecting IC terminal 32, and an input switch (input unit) 33.

The finger print sensor 30 herein is an electrostatic capacity type, that is, detecting a finger print pattern by measuring an electrostatic capacity fluctuating according to a distance between a finger print having concavity and convexity and a detecting surface.

Specifically, as the user's finger touches the finger print sensor 30, TFTs (thin film transistors) arranged in a matrix pattern extract finger print information in terms of electrostatic capacity.

Further, an IC chip (arithmetic unit) is built inside the IC card K to compare extracted finger print information to preset finger print information for verification.

Further, an EPD 31 is an electrophoretic display using electrophoresis. Since the EPD 31 is a display element having a property of remembering display and a property of display memory of an image, as a drive element such as the TFT provides a preset voltage during preset time, it is possible to hold the image without providing further voltage thereafter.

Because this enables power consumption for displaying images to be reduced, low power consumption may be realized, while, at the same time, realizing the IC card K having the property of display memory. In the embodiment, it functions as a staff identity card, which the EPD 31 displays as staff information.

Further, the connecting IC terminal 32 connects to a terminal provided at an external device when transmitting and receiving information between the IC card K and the un-illustrated external device. Furthermore, the connecting IC terminal 32 is connected to an IC chip provided inside the IC card K such as to transmit and receive input/output signals between the external device and the IC chip.

Further, as shown in FIG. 2B, an input switch 33 is formed by protruding further upward from a surface 34 of the IC card K. The input switch 33 has an elastic member on the inside of the IC card K, so that it shifts in the direction of a sign 33a as an suppressing force generates, while, at the same time, it is restored back into the direction of a sign 33b as the suppressing force is released.

Consequently, the input switch 33 operates in such a way that it is suppressed and restored in the perpendicular direction to the surface 34. Further, while the input switch 33 is in a condition of being suppressed, a power source of the IC card K is in an "off" state, that is, in the halt status. Also, while the input switch 33 is in the condition of not being suppressed, the power source of the IC card K is in an "on" state, that is, in the initiating status.

Further, a thickness G of the IC card K is of a dimension which is slightly less than the above-referenced distance F (distance between the inner upper surface 12 and the inner bottom surface 11 of the case body 2) and which enables the IC card K to be easily inserted into a storage space 2c of the case body 2.

Also, as for the length dimension and the width dimension of the IC card K, they are made slightly less than the storage space 2c of the case body 2, so that they are in such dimensions as to let the IC card K to be easily inserted.

In the embodiment, no limits are set to a dimensional difference between the storage space 2c dimensions and the IC card K dimensions. However, so long as there is a clearance of about 0.5 mm respectively in regard to the length, width, and height dimensions, the IC card K can be easily inserted into and pulled out of the storage space 2c.

Operation to Insert/Take Out the IC Card in the Card Case

Operation to insert/take out the IC card K in the above-referenced card case will now be described with reference to FIG. 1 and FIG. 2.

First, the operation to insert the IC card K into the card case will be described. While the IC card K is in the condition of not being inserted, since the input switch 33 is not being suppressed, the IC card K's power source is in the "on" state, that is, the initiating status.

First, the user abuts the IC card K against the guide part 7 and inserts the IC card K into the inserting mouth 6. At this point, part of the IC card K in contact with the guide part 7 is inserted into the inserting mouth 7 while sliding on the guide part 7.

Next, the IC card K is inserted in the inserting direction C into the storage space 2c of the card body 2. As the IC card is being gradually inserted deeper into the storage space 2c, the sloped portion 10 of the suppressing part 3 and the input switch 33 come into contact. As the IC card K is further inserted, since a distance D gradually decreases according to the direction pointed by the inserting direction C, the sloped portion 10, while sliding over the upper part of the switch 33, suppresses in the direction of the sign 33a.

By inserting deep into the storage space 2c until the IC card K abuts, the suppressing state of the input switch 33 is held by the planar part 3a. Because the input switch 33 is suppressed in this way, the power source of the IC card K comes to the "off" state, that is, the halt status.

While the IC card K is in the condition of being stored in the card case 1 in this manner, a space formed by the step part 4 is formed on the finger print sensor 30, so that a non-contact state is maintained between the finger print sensor 30 and the upper surface 4a of the step part 4.

Next, a case of taking out the IC card K from the card case 1 will be described.

When taking out the IC card stored in the case body 2, the user puts the finger into the opening part 5, holds the reverse side of the IC card K, provides a shifting force towards the inserting mouth 6, and slides the IC card K.

Then, the input switch 33 being suppressed by the planar portion 3a shifts to the sloped portion 10, and further, by sliding on the surface of the slope 10, the input switch 33 gradually protrudes in the direction of the sign 33b. And the IC card K is taken out of the inserting mouth 6.

As the input switch 33 protrudes in this way, a power source of the IC card K is in the "on" state, that is, the initiating status. And the user touches the finger print sensor 30 with the finger and carries out finger print verification.

As described above, in the embodiment, when the IC card K is inserted into the card case 1, the suppressing part 3 suppresses the input switch 33, so that the IC card K may be placed in the halt status.

On the other hand, when the IC card K is taken out of the card case 1, a restoring force operates such as to cause the input switch 33 to protrude from the surface 34, thus enabling the IC card K to be put in the initiating status. Consequently, the halt status can be maintained when storing the IC card K, so that even if another input is made into the IC card, wrong initiation or wrong operation may not occur. Hence, the on/off of the IC card operation can be controlled with certainty.

Further, because the suppressing part 3, which is formed in the card case 1, has the sloped portion 10, when the IC card K is inserted while the upper part of the input switch 33 is in the condition of being in contact with the sloped portion 10, the sloped part 10, sliding on the upper part of the input switch 33 at its surface, is able to suppress.

In this way, by using a slide between the sloped portion 10 and the input switch 33, the input switch 33 can be suppressed in the direction of 33a which is different from the inserting direction C.

Further, since the card case 1 has the step part 4, when inserting the IC card K into the card case 1, or when the IC card K is stored in the card case 1, and the like, it is possible to hold the finger print sensor 30 and the case body 2 in the non-contact state. This makes it possible to prevent scratches due to contact or slide between the finger print sensor 30 and the case body 2, thus forestalling breakage of the finger print sensor 30.

Further, since the card case 1 has the opening part 5, it is possible for the user to touch the IC card K with the finger through the opening part 5. By sliding the finger that touched the IC card K in a reverse direction to the inserting direction C of the IC card K, the IC card K can be easily taken out of the card case 2.

Further, because the card case 1 has the guide part 7, it is possible to insert the IC card K into the card case 1 by sliding it over the guide part 7. Namely, the IC card K can be easily stored.

On the other hand, if there is no guide part 7, the user must directly insert the IC card K into the inserting mouth 6. Hence, it is not easy to insert the IC card K into the card case 1. Consequently, by having the guide part 7, the IC card K can be easily stored in the card case 1.

Further, the card case 1 is formed of a transparent material, so that whether the IC card is inside the case body 2 can be ascertained. Also, since the card case 1 is formed of a flexible material, it can be used by attaching the card case to a flexible member. For example, the card case can be attached to clothes and the like.

Second Embodiment of a Card Case

A second embodiment of a card case of the invention will be described with reference to the drawings.

Figure 3:
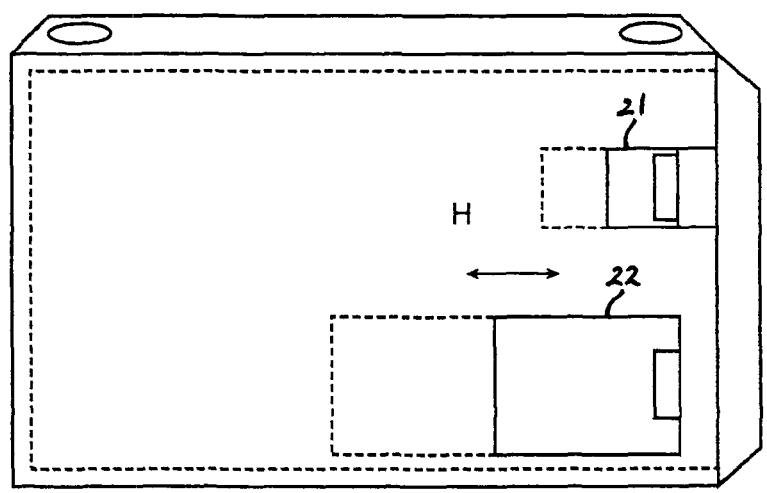
FIG. 3 is a plan view showing a card case of a third embodiment.

FIG. 3 is an exterior view of a card case and a plan view of the card case as seen from the front side of the card case according to the embodiment. In the embodiment, like numbers refer to like elements of the first embodiment and description is hereby omitted, whereas only different elements will be described.

As shown in FIG. 3, the card case 1 has a switch window (first window part) 21 and a sensor window (second window part) 22.

While the switch window 21 and the sensor window 22 herein are designed to slide in the direction of a sign H, opening and closing the case body is possible only with respect to portions corresponding to the switch window 21 and the sensor window 22.

Specifically, the windows 21 and 22 can be opened together by sliding them in the left direction of the sign H. Also, the windows 21 and 22 can be closed together by sliding them in the right direction.

The above-referenced suppressing part 3 is herein formed on the switch window 21. Further, the above-referenced step part 4 is formed on the sensor window 22.

By this means, while the IC card K is in the condition of being stored in the card case, when the switch window 21 opens, the input switch 33 exposes itself while sliding on the surface of the sloped portion 10 and the input switch 33 is in the condition of protruding in the direction of the sign 33b. Further, upon closing the switch window 21, the input switch 33 enters the condition of being suppressed in the direction of the sign 33a.

Further, likewise, when the sensor window 22 opens while the IC card K is in the condition of being stored, the finger print sensor 30 exposes itself to enable the finger print information of the user's finger to be extracted. Further, by closing the sensor window 22, the finger print sensor 30 is covered by the sensor window 22, thereby protecting the finger print sensor 10.

As described above, in the embodiment, the IC card K can be put in the halt status while the switch window 21 is in the closed state, whereas the IC card K can be put in the initiating status while the switch window 21 is in the open state.

Hence, by opening and closing the switch window 21, the "on" and "off" of the IC card K operation can be controlled with certainty while the IC card K is in the condition of being stored in the card case 1.

Further, it is possible to protect the finger print sensor 30 while the sensor window 22 is in the closed state, and the finger print sensor 30 can be exposed while the sensor window 22 is in the open state.

Consequently, by opening and closing the sensor window 22, while the IC card K is in the condition of being stored in the card case 1, it is possible to protect the finger print sensor 30 or expose the finger print sensor 30. Therefore, while the IC card K is in the condition of being stored, it is possible to carry out personal verification of the user through the use of the finger print sensor 30.

Third Embodiment of the Card Case

A third embodiment of a card case of the invention will be described with reference to the drawings.

Figure 4:
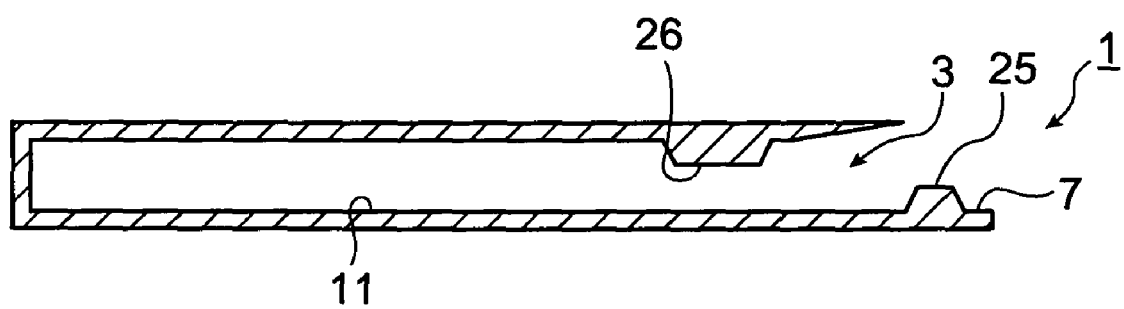
FIG. 4 is a sectional view showing the card case of a third embodiment.

FIG. 4 is a sectional view of the card case. In the embodiment, like numbers refer to like elements of the first and second embodiments and description is hereby omitted, whereas only different elements will be described.

As shown in FIG. 4, the card case 1 has a stopper (fall-off preventing part) 25 formed on the guide part 7 and a protruding portion 26 formed on the suppressing part 3. Further, the IC card K stored in the card case 1 of the embodiment has an input switch 33 which is positioned on the same surface as the surface 34 or positioned at a surface depressed from the surface 34.

And the protruding portion 26 is designed such as to suppress the input switch 33 which is positioned on the same surface as the surface 34 or positioned at the surface depressed from the surface 34 when storing the IC card K in the card case 1. Further, the stopper 25 purports to suppress the IC card K in the storage state from falling off the storage space 2c.

As described above, in the present embodiment, because the card case 1 has the protruding portion 26, it can suppress the input switch 33 with certainty even if the input switch 33 is positioned on the same surface as the surface 34 or positioned at the surface depressed from the surface 34. This makes it possible to maintain the IC card K, while being stored, in the halt status.

Further, since the card case 1 has the stopper 25, dropping or falling off of the IC card K can be suppressed. As a result, it is possible to maintain with certainty the condition of the IC card K being stored.

It should be noted that the invention is naturally not limited to the above-referenced embodiments but may be modified in various forms without departing from the spirit of the invention.

Further, in the above-referenced embodiments, while the IC card K having the EPD 31 has been described, it is not always necessary to have the EPD 31. The IC card K having no EPD 31 may be stored in the card case 1.

What is claimed is:

1. A card case assembly, comprising:
    a card case body, the card case body including an upper member and a lower member defining a storage space therebetween; and
    an IC card operable to be inserted into the storage space of the card case body,
    wherein the upper member includes a planar surface that merges into a sloped section proximate a terminal edge of the upper member that defines a suppressing surface,
    the IC card includes a major surface that includes a finger print sensor, a display region, an IC terminal, and a depressible switch that protrudes from the major surface and is depressible in a direction toward the major surface, and
    upon insertion of the IC card into the storage space of the card case body, the suppressing surface depresses the switch toward the major surface.

2. The card case assembly according to claim 1, wherein the storage space has an inserting mouth into which the IC card is inserted, the inserting mouth defined by a guide part formed integral with the lower member that extends outward relative to the upper member that guides the IC card into the storage space.

3. The card case assembly according to claim 2, wherein the guide part includes a protrusion extending upward from a major surface of the lower member, the protrusion preventing the IC card stored in the storage space from exiting the storage space.

4. The card case assembly according to claim 1, wherein the card case body is formed of a transparent material.

5. The card case assembly according to claim 1, wherein the card case body is formed of a flexible material.

* * * * *